United States Patent
Jee et al.

(10) Patent No.: US 8,620,321 B2
(45) Date of Patent: Dec. 31, 2013

(54) METHOD AND APPARATUS FOR THE HANDOVER

(75) Inventors: Junghoon Jee, Daejeon (KR); Chang-Min Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 713 days.

(21) Appl. No.: 12/741,574

(22) PCT Filed: Nov. 7, 2008

(86) PCT No.: PCT/KR2008/006575
§ 371 (c)(1),
(2), (4) Date: May 5, 2010

(87) PCT Pub. No.: WO2009/061151
PCT Pub. Date: May 14, 2009

(65) Prior Publication Data
US 2010/0260144 A1     Oct. 14, 2010

(30) Foreign Application Priority Data

Nov. 7, 2007   (KR) .................. 10-2007-0113076
Nov. 7, 2008   (KR) .................. 10-2008-0110393

(51) Int. Cl.
*H04W 36/00*     (2009.01)
*H04W 4/00*      (2009.01)

(52) U.S. Cl.
USPC ........... 455/436; 455/437; 455/438; 455/439; 455/442; 370/331; 370/332

(58) Field of Classification Search
USPC ............... 370/329, 331–334; 455/432.3, 436, 455/437, 438, 439, 441, 442, 443, 444
See application file for complete search history.

(56) References Cited

U.S. PATENT DOCUMENTS

| | | |
|---|---|---|
| 2005/0249161 A1 | 11/2005 | Carlton |
| 2006/0025169 A1 | 2/2006 | Maciocco et al. |
| 2006/0268782 A1* | 11/2006 | Kwak et al. .................. 370/331 |
| 2007/0072615 A1 | 3/2007 | Kim et al. |
| 2008/0101300 A1* | 5/2008 | Oh ................................ 370/332 |
| 2009/0016286 A1* | 1/2009 | Fajardo et al. ............... 370/329 |
| 2009/0047959 A1* | 2/2009 | Oba et al. ..................... 455/436 |
| 2010/0131663 A1* | 5/2010 | Lee et al. ...................... 709/228 |

OTHER PUBLICATIONS

Gupta et al "Handover Commands Update" LB Issue-#18: Comment 495, Sep. 2006.*
T. Melia et al., "Impact of Heterogeneous Network Controlled Handovers on Multi-Mode Mobile Device Design", Wireless Communications and Networking Conference 2007, pp. 3884-3889, Mar. 11-15, 2007.
International Search Report mailed on Jul. 2, 2009 in International Patent Application No. PCT/KR2008/006575.
Written Opinion of the International Searching Authority mailed on Jul. 2, 2009 in International Patent Application No. PCT/KR2008/006575.

* cited by examiner

*Primary Examiner* — Awet Haile
(74) *Attorney, Agent, or Firm* — Kile Park Reed & Houtteman PLLC (57) ABSTRACT

Consistent handover can be provided between a plurality of objects by providing handover mode control information defining an object for initiating handover from among at least one object in a system environment including the at least one object, wherein the at least one object is able to initiate handover between heterogeneous networks.

15 Claims, 7 Drawing Sheets

METHOD AND APPARATUS FOR THE HANDOVER

TECHNICAL FIELD

The present invention relates to performing handover in a heterogeneous network environment, and more particularly, to a method and apparatus for controlling a handover mode in a heterogeneous network environment.

The present invention is derived from a research project supported by the Information Communication Standard Research & Development (R&D) program of the Ministry of Information and Communication (MIC) and the Institute for Information Technology Advancement [2007-P10-01 Mobility Standard in Next-generation Mobile Communication].

DETAILED DESCRIPTION OF THE INVENTION

Technical Problem

The present invention is provided in order to overcome a problem that can arise when a terminal including at least one heterogeneous network interface selects a network that is subject to handover.

When handover is performed in a heterogeneous network environment, handover may be performed in a terminal or a serving point of service (PoS) that is currently connected to the terminal. Thus, when handover is performed in a heterogeneous network environment, it is required to recognize which is more efficient for initiating handover from among the terminal or the serving POS.

When the terminal and the serving PoS initiate handover without the above information, unnecessary handover may be initiated or a redundant process may be performed. In addition, unnecessary messages may be transmitted due to inconsistent handover.

Thus, the present invention is provided in order to overcome a problem generated due to the inconsistent handover between the terminal and the serving PoS that is currently connected to the terminal when handover is performed in a heterogeneous network environment and to overcome a problem arising with redundant processes generated when handover is performed in a heterogeneous network environment.

Technical Solution

According to an aspect of the present invention, there is provided a handover method in which handover is performed in a user terminal and a serving point of service (PoS) that is currently connected to the user terminal in a heterogeneous network environment, according to a handover mode that is previously set by an information server.

Advantageous Effects

Handover mode control information is stored and managed by an information server so as to perform handover between heterogeneous networks according to the same handover mode that is previously set with respect to a user terminal and a serving point of service (PoS).

Thus, when handover between heterogeneous networks is performed by a multimode user terminal including at least two heterogeneous network interfaces, handover can be consistently performed between the user terminal and the serving PoS.

BEST MODE

According to an aspect of the present invention, there is provided an apparatus including handover mode control information defining an object for initiating handover from among at least one object in a system environment including the at least one object, wherein the at least one object is able to initiate handover between heterogeneous networks.

According to another aspect of the present invention, there is provided a method of selecting a handover target network. The method may include requesting an information server for information regarding a network that is subject to handover, and receiving the information regarding the network that is subject to handover in response to the request; transmitting a query to the candidate network regarding whether a resource of a candidate network that is able to initiate handover is available to the candidate network that is selected according to the received information regarding the network, and receiving a response to the query from the candidate network; and requesting a target network finally performing handover, which is determined according to the response of the candidate network, for handover, and receiving a response to the request.

According to another aspect of the present invention, there is provided a method of selecting a handover target network. The method may include requesting an information server for information regarding a network that is subject to handover, and receiving the information regarding the network that is subject to handover in response to the request, wherein the requesting and receiving are performed by a network PoS that is currently connected to a terminal; transmitting a query regarding whether the terminal intends to perform handover initiated by the network PoS, which is currently connected to the terminal, to the terminal, and receiving a response to the query from the terminal; transmitting a query regarding whether a resource of the candidate network is available to the candidate network that is selected according to the response to the query regarding whether the terminal intends to perform handover and the information regarding the network that is subject to handover to the candidate network that is able to initiate handover, and receiving a response to the query regarding whether the resource of the candidate is available, wherein the transmitting and the receiving are performed by the terminal; and requesting a target network determined according to the response of the candidate network for handover, and receiving a response to the request.

According to another aspect of the present invention, there is provided a terminal. The terminal may include at least one interface unit for performing handover between heterogeneous networks; a receiving unit receiving at least one of handover mode control information defining an object for initiating handover from among at least one object in a system environment including at least one object that is able to initiate handover between heterogeneous networks and information regarding a network that is subject to handover between the heterogeneous network; a query unit selecting a candidate network that is able to initiate handover according to the received information and transmitting a query regarding whether a resource for supporting handover is available to the candidate network; and a converting unit requesting a target network finally performing handover, which is determined according to a response of the candidate network and receiving a response from the target network.

MODE OF THE INVENTION

For convenience of description of the configuration and effect of the present invention, terms used in this specification and the technological feature of the present invention will be described.

The terms used in this specification will now be defined.

A 'heterogeneous network environment' is an environment including at least two networks having different characteristics. For example, a wireless local area network (LAN), a wireless broadband internet (WiBro) and a wireless code division multiple access (CDMA) may constitute a heterogeneous network environment.

A 'current network' is a network that is currently connected to a user terminal to provide network connectivity to the user terminal, that is, a network constituting a communication environment that is currently provided (i.e., currently connected) to the user terminal. In this specification, the current network is also used as a 'serving point of service (POS)'.

'Neighboring networks' refer to networks positioned around the current network.

'Candidate networks' refer to networks that can be selected as a destination from among the neighboring networks by a user terminal, that is, networks to which handover can be performed from the current network.

A 'target network' is a destination of the user terminal, that is, a network that is subject to handover, from among the candidate networks.

Hereinafter, the present invention will be described more fully with reference to the accompanying drawings, in which exemplary embodiments of the invention are shown. In the drawings, like reference numerals denote like elements. Also, while describing the present invention, detailed descriptions about related well-known functions or configurations that may diminish the clarity of the points of the present invention are omitted.

Figure 1:
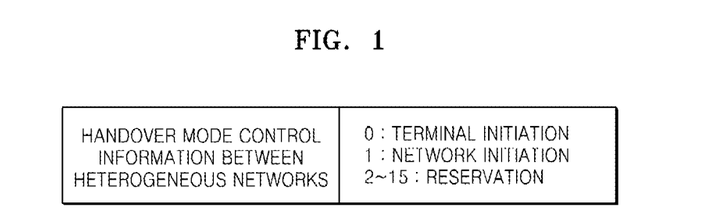
FIG. 1 is a diagram for explaining handover mode control information managed by an information server, according to an embodiment of the present invention.

FIG. 1 is a diagram for explaining handover mode control information managed by an information server, according to an embodiment of the present invention.

According to the present embodiment, the information server stores information regarding a network that is subject to handover between heterogeneous networks, and stores handover mode control information between the heterogeneous networks.

Various handover processes including a mobile-initiated handover process and a network-initiated handover process may be defined in a process of handover between the heterogeneous networks, and information regarding the mobile-initiated handover process and network-initiated handover process may also be managed by the information server.

That is, the present invention is not limited to the mobile-initiated handover process and the network-initiated handover process.

In addition, the mobile-initiated handover process includes processes that are initiated in a user terminal according to a type of handover initiated between heterogeneous networks. The network-initiated handover process includes processes that are initiated in the serving POS. Hereinafter, exemplary embodiments of the present invention will be described.

FIG. 1 is a diagram for explaining handover mode control information stored in an information server, according to an embodiment of the present invention.

Referring to FIG. 1, when the handover mode control information corresponds to '0', mobile-initiated handover is performed. When the handover mode control information corresponds to '1', network-initiated handover is performed.

An entity in which handover is initiated according to the handover mode control information checks whether handover between heterogeneous networks is required. When the handover is required, the entity in which handover is initiated transmits a message of initiating the handover to an entity that responds to the handover so as to initiate the handover. FIG. 1 is only for illustrative purpose, and thus it will be understood by one of ordinary skill in the art that various changes in form and details may be made.

Figure 2A:
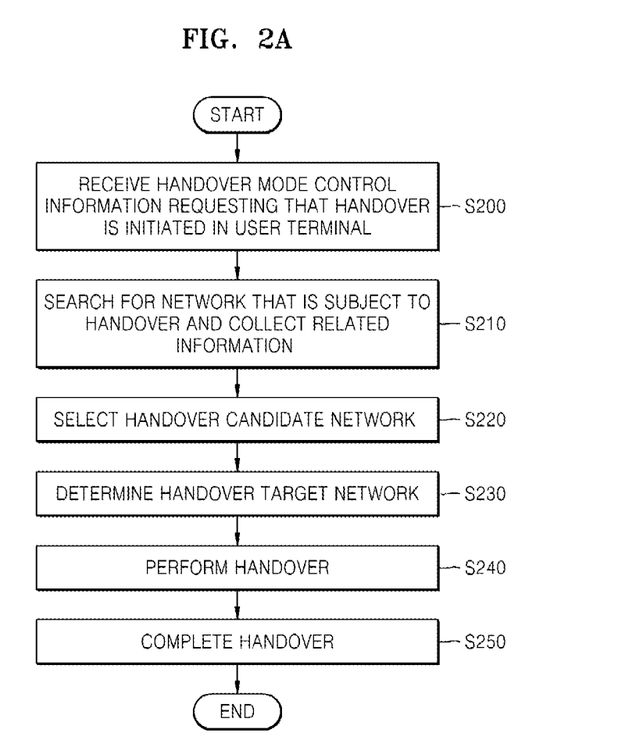
FIGS. 2A through 2C illustrate the case where mobile-initiated handover is performed according to handover mode control information managed by an information server, according to an embodiment of the present invention.
Figure 2B:
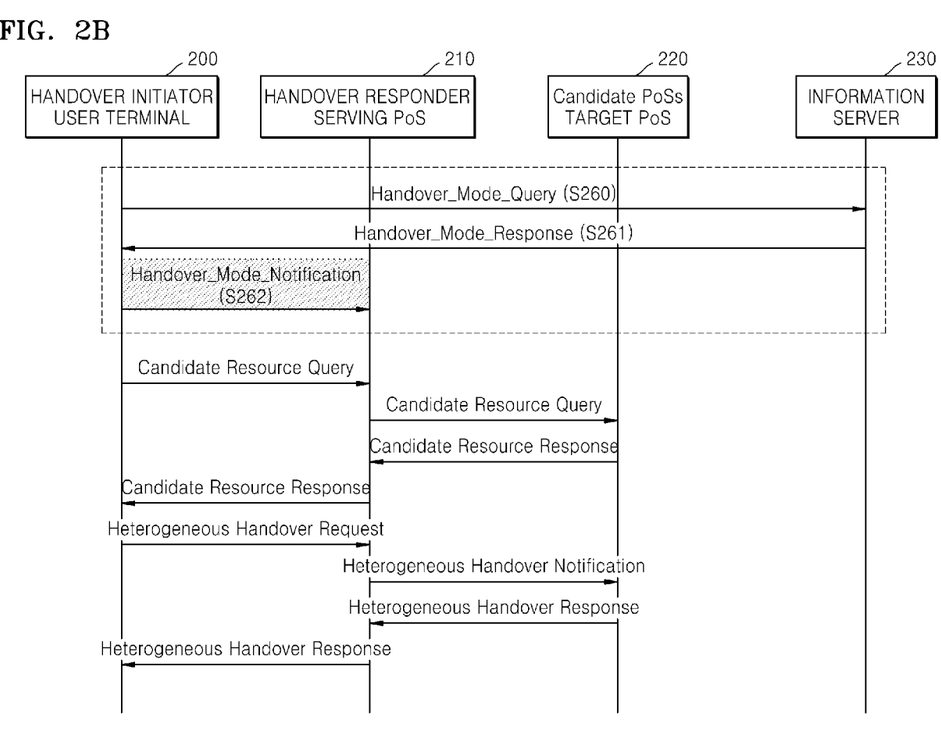
Figure 2C:
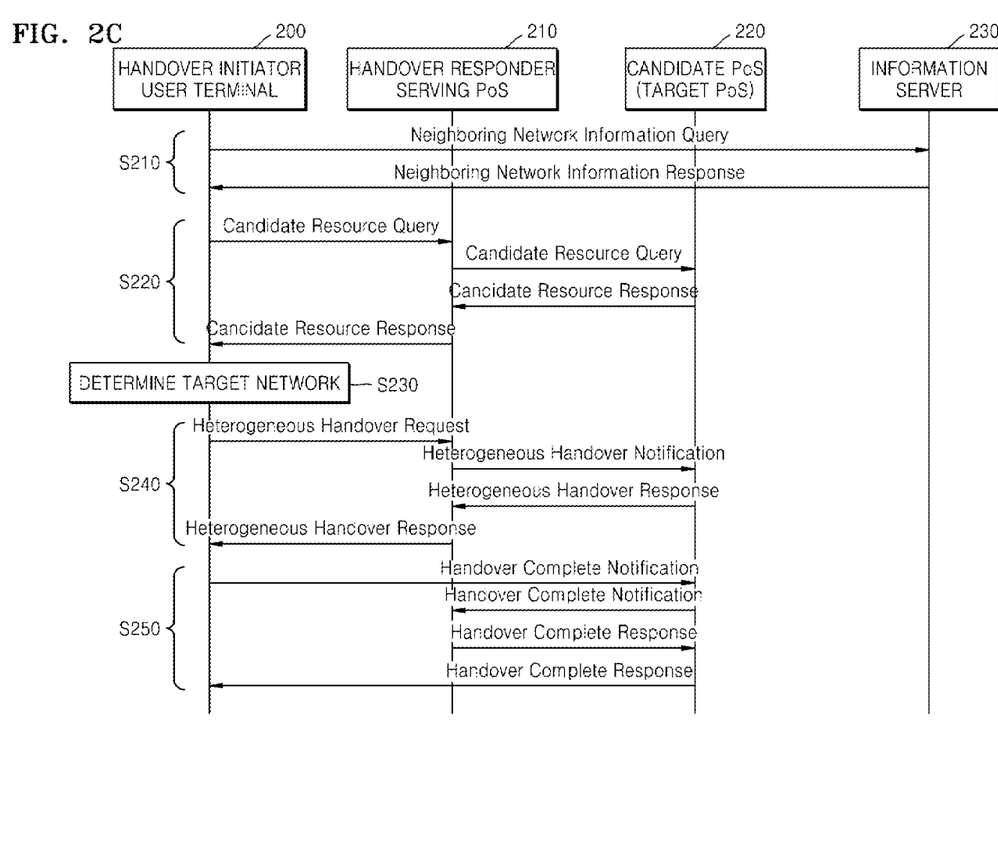

FIGS. 2A through 2C illustrate the case where mobile-initiated handover is performed according to handover mode control information managed by an information server, according to an embodiment of the present invention.

FIG. 2A is a flow chart illustrating the case where mobile-initiated handover is performed, according to an embodiment of the present invention.

When a user terminal 200 (see FIG. 2B) receives the handover mode control information regarding that the user terminal 200 is a handover initiator from an information server 230 (see FIG. 2B), the user terminal 200 searches for a network that is subject to handover and collects related information, in operation S210.

However, the user terminal 200 may also receive the handover mode control information while searching for the network that is subject to handover and collecting the related information without receiving the handover mode control information from the information server 230. That is, operation S200 is not always performed prior to operation S210.

When searching for the network (operation S210) is completed, handover candidate networks are selected, in operation S220.

In this case, first, the user terminal 200 that obtains information of neighboring networks from the information server 230 in the searching for the network (operation S210) checks whether the handover is required.

The user terminal 200 checks a current network link that is currently connected to the user terminal 200 and a heterogeneous network to which the user terminal 200 can perform handover in real-time to measure the quality and signal strength of the current network link and the quality and signal strength of the heterogeneous network. Then, when the measured values of the current network link are equal to or less than threshold values, and the measured values of the heterogeneous network are equal to or more than threshold values, it is determined that the handover is required.

When the handover is required, the user terminal 200 requests a serving POS 210 for selecting the handover candidate networks having resources by which the user terminal 200 can perform handover, from among the neighboring networks of which information is obtained in the searching for the network (operation S210), in operation S220.

As an example, the user terminal 200 may select the handover candidate networks according to a kind of a network in which handover and information regarding a subscription service can be performed via a network interface included in the user terminal 200.

Then, the user terminal 200 selects a handover target network that is subject to final handover from among the handover candidate networks selected in the operation S220 (operation S230). The handover target network may be automatically selected according to a reference (e.g., quality of service (QoS), service costs, etc.) that is previously set in the user terminal 200, or may be selected by user's input responding to a separate query directed to a user of the user terminal 200.

The user terminal 200 performs a handover execution phase (operation S240) with respect to the handover target network, and completes the handover (operation S250).

FIG. 2B illustrates the case where mobile-initiated handover is performed according to the handover mode control information, according to an embodiment of the present invention.

The features of elements illustrated in FIG. 2B will be described. However, the descriptions are only for illustrative purposes and are not intended to limit the scope of the present invention.

The user terminal 200 includes both a mobile terminal movable between networks and a fixed terminal. The serving PoS 210 is a PoS of the current network to which the user terminal 200 is currently connected, and supports the user terminal 200 in selecting the handover target network that is subject to handover in a heterogeneous network environment.

Candidate PoSs 220 are PoSs positioned in the handover candidate networks from which the handover target network that is subject to the handover of the user terminal 200 is selected. A PoS of a network selected from among the candidate PoSs 220, as the handover target network of the user terminal 200 is a target PoS.

At this time, the above various PoSs may be embodied in a point of attachment (PoA) which provides a layer 2 wired/wireless connection function or in an access router (AR) which provides a layer 3 connectivity. In addition, the above various PoSs may be positioned in an appropriate network device except in the PoA or the AR.

The information server 230 is a server storing various kinds of information like resources of the neighboring networks, and provides neighboring network information to the user terminal 200 or the serving PoS 210 to support the user terminal 200 or the serving PoS 210 in selecting the handover target network.

As illustrated in FIG. 2B, the user terminal 200 transmits a query regarding a handover mode to the information server 230 in operation S260, receives a response to the query in operation S261, and transmits a notification of initiating handover in the user terminal 200 to the serving PoS 210 in operation S262. Thus, the user terminal 200 and the serving PoS 210 can consistently perform handover.

FIG. 2B illustrates the case where it is checked whether a handover initiator is the user terminal 200, according to an embodiment. Alternatively, the user terminal 200 may receive a notification regarding the handover mode control information from the information server 230 without any request. In addition, it will be understood by one of ordinary skill in the art that a handover initiator may be determined by the information server 230.

FIG. 2C illustrates a method in which mobile-initiated handover is performed, according to an embodiment of the present invention.

A handover method includes a network discovery phase (operation S210) in which a handover initiator is recognized, a network that is subject to handover is searched for and related information is collected, a candidate network selection phase (operation S220) in which the handover candidate networks are selected, operation S230 of selecting the handover target network, and operations S240 and S250 of performing and completing handover.

The user terminal 200 recognizes that the user terminal 200 itself is the handover initiator by obtaining the handover mode control information as illustrated in FIG. 1 through the query directed to the information server 230 or the notification of the information server 230 without any request.

First, the network discovery phase (operation S210) of searching for a network that is subject to handover from among the neighboring networks is performed by the user terminal 200 performing handover. In the network discovery phase (operation S210), the user terminal 200 requests information regarding the neighboring networks by transmitting a neighboring network information query message to the information server 230, and the information server 230 transmits the information regarding the neighboring networks by transmitting a neighboring network information response message to the user terminal 200 in response to the neighboring network information query message.

The neighboring network information query message transmitted by the user terminal 200 may include a query regarding whether the user terminal 200 itself initiates handover. In this case, the neighboring network information response message may include the handover mode control information that is information indicating an entity for initiating handover from among a plurality of entities.

The information regarding the neighboring networks, which is obtained by the user terminal 200 from the information server 230 may include information regarding a kind of each neighboring network (e.g., IEEE 802.11, IEEE 802.16, CDMA, UMTS, etc.), an address of a network connection device (e.g., MAC address and IP address of PoA or AR) and a network service provider or the like.

The network discovery phase (operation S210) is completed, and then the candidate network selection phase (operation S220) in which the handover candidate networks are selected is performed.

The user terminal 200 that obtains the information regarding the neighboring networks from the information server 230 in the network discovery phase (operation S210) determines whether handover is required. That is, the user terminal 200 checks a current network link that is currently connected to the user terminal 200 and a heterogeneous network to which the user terminal 200 can perform handover (can be connected) in real-time to measure the quality and signal strength of the current network link and the quality and signal strength of the heterogeneous network. Then, when the measured values of the current network link are equal to or less than threshold values, and the measured values of the heterogeneous network are equal to or more than threshold values, it is determined that handover is required.

When the user terminal 200 determines that handover is required, the user terminal 200 transmits a candidate resource query message to the serving PoS 210 to request the serving PoS 210 for checking whether resources of the candidate networks are available to support the user's terminal's handover. At this time, the user terminal 200 requests the serving PoS 210 for checking whether only resources of the handover candidate networks is available from among the neighboring networks, to which the user terminal 200 can perform handover. The handover candidate networks are selected by searching for the network that is subject to handover in the network discovery phase (operation S210) according to information regarding a kind of a network to which the user terminal 200 can perform handover and service subscription information, from among the information regarding the neighboring networks, obtained from the information server 230 by searching for the network that is subject to handover in the network discovery phase (operation S210). The network discovery phase (operation S210) may be performed together with operations illustrated in FIG. 2B.

The serving PoS 210 receives the request for checking whether the candidate networks are available from the user terminal 200, and transmits the candidate resource query message to the candidates PoSs 220 positioned in the handover candidate networks to request the candidates PoSs 220 for checking whether resources for supporting the user terminal 200 are available.

Each of the candidate PoSs 220 checks whether the resources for the handover of the user terminal 200 is available in a network in which the each of the candidate PoSs 220 is positioned, and responds to the request by transmitting the candidate resource response message to the serving PoS 210. The serving PoS 210 collects responses from the candidate PoSs 220 of the handover candidate networks, and transmits the candidate resource response message to the user terminal 200, thereby completing the candidate network selection phase (operation S220).

When the candidate network selection phase (operation S220) is completed, the target network decision phase (operation 230) is performed.

The user terminal 200 determines the handover target network according to the information regarding whether the resources of the candidate networks are available, which is obtained from the serving PoS 210 in the candidate network selection phase (operation S220). At this time, the handover target network is automatically determined according to a reference (e.g., QoS, service costs, etc.) that is previously set in the user terminal 200, or may be determined by user's input responding to a separate query directed to a user of the user terminal 200.

That is, when resources of at least two handover candidate networks are available, a single final handover target network is automatically determined according to the configuration information that is previously set in consideration of service costs and quality. When a final handover target network determined according to the reference of the service costs and quality is different from the above determined final handover target network, a final handover target network is determined according to the priority order. At this time, the priority order may be previously set by a provider or a user. On the other hand, information regarding at least one candidate network is separately reported via a user interface and the final handover target network may be determined according to user's determination input.

The handover target network is determined in the target network decision phase (operation 230), and then the user terminal 200 performs the handover execution phase (operation S240) with respect to the handover target network.

In this case, when the number of the selected handover target network is not determined to be at least two, since the selected handover target network is unique, the selected handover target network is determined to be final unique handover target network.

When the number of the selected target networks is determined to be at least two, information regarding the handover candidate networks in which all resources are available is checked, and then the handover target network is selected according to a reference of QoS and service costs.

The reference is only for illustrative purpose, and thus it will be understood by one of ordinary skill in the art that various changes in form and details may be made.

For example, when QoS is prior to service costs, a network satisfying QoS is determined to be final unique handover target network. At this time, QoS and service costs as the reference for determining the handover target network are only for illustrative purpose, and thus the present invention is not limited thereto.

The user terminal 200 selects the final handover target network in operation S230, and then tries to perform handover (connection) with respect to the final handover target network. Then, the user terminal 200 transmits a heterogeneous handover request message to the serving PoS 210 to request the serving PoS 210 for handover to the final handover target network.

The serving PoS 210 that receives the request for handover transmits a heterogeneous handover notification message to a target PoS of the final handover target network selected from among the Candidate PoSs 220 to report the request for handover, which is performed by the user terminal 200.

The Target PoS notifies the serving PoS 210 of a response to the request for handover by transmitting a heterogeneous handover response message to the serving PoS 210. Then, the serving PoS 210 transmits the heterogeneous handover response message to the user terminal 200 to perform handover of the user terminal 200.

When the handover execution phase (operation S240) is performed by the user terminal 200 with respect to the target network, a handover completing phase (operation S250) is performed. The handover completing phase (operation S250) is performed by exchanging complete messages indicating that handover is completed between the user terminal 200 and the target PoS 220, and between the serving PoS 210 and the target PoS 220.

The user terminal 200 notifies the target PoS 220 of the fact that handover is completed by transmitting a handover complete notification message to the target PoS 220. The target PoS 220 transmits the fact that handover is completed to the serving PoS 210 by transmitting the handover complete notification message. The mentioned serving PoS is an entity which serves the user's terminal at the previous network before the handover is executed.

At this time, when the fact that handover is completed in the target PoS 220 can be known without interruption of the user terminal 200, the target PoS 220 may notify the serving PoS 210 of the fact that the handover is completed.

The serving PoS 210 responds to the complete notification by transmitting a handover complete response to the target PoS 220. The target PoS 220 transmits the response to the complete notification by transmitting the handover complete response message to the user terminal 200.

Figure 3A:
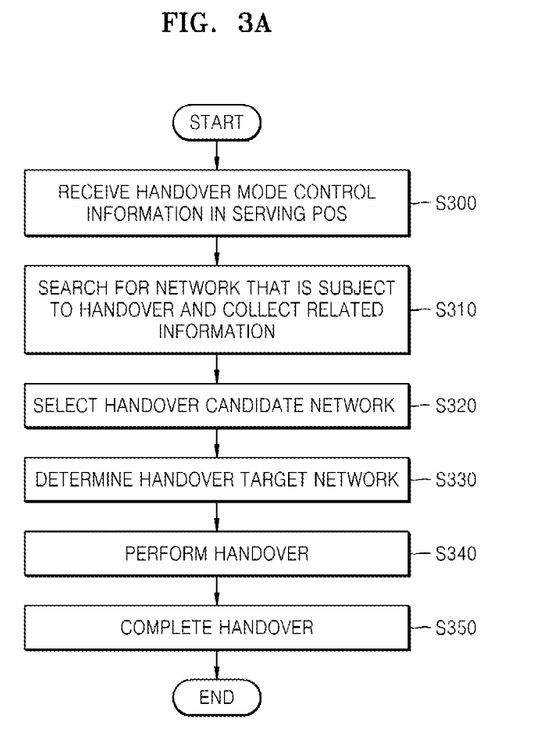
FIGS. 3A through 3C illustrate the case where handover is performed in a serving point of service (PoS) according to handover mode control information managed by an information server, according to an embodiment of the present invention.
Figure 3B:
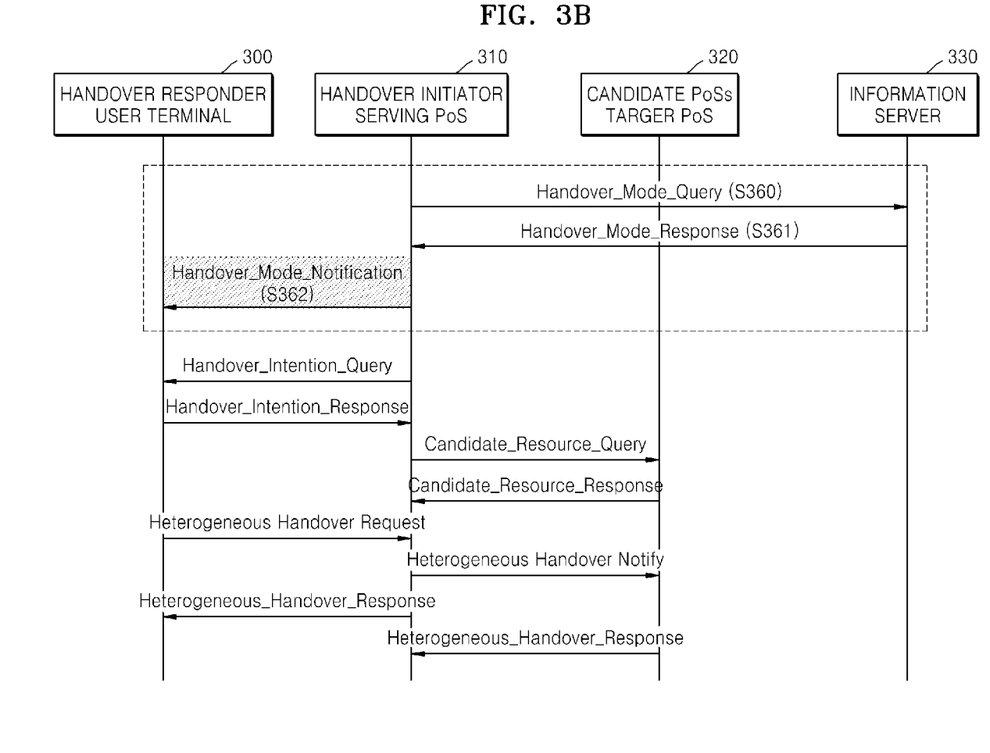
Figure 3C:
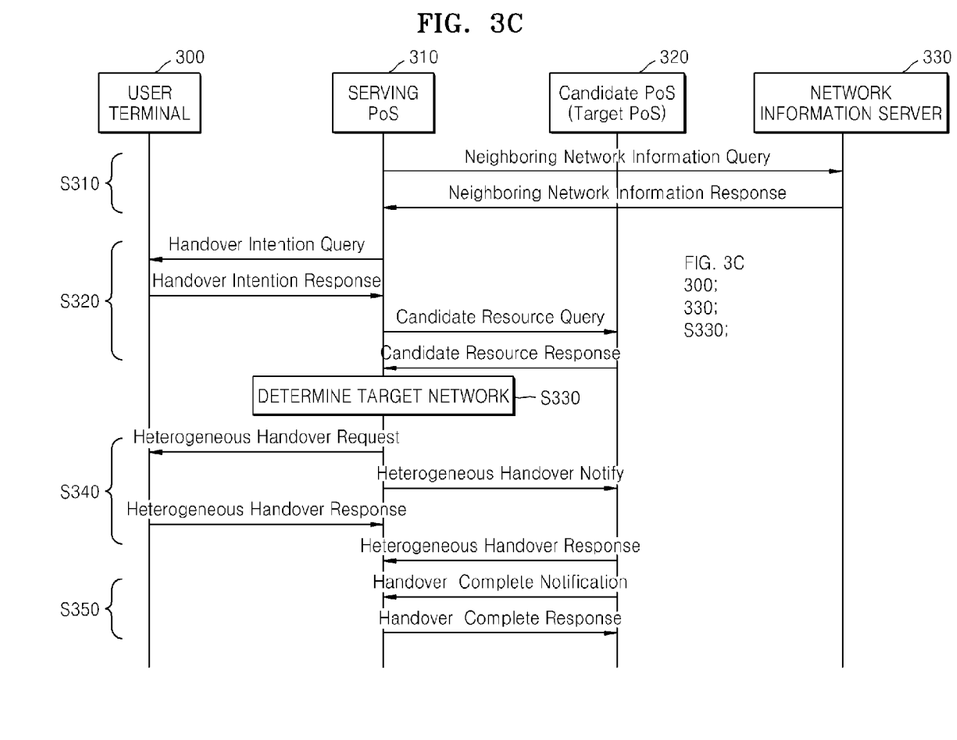

FIGS. 3A through 3C illustrate the case where handover is performed in a serving PoS according to handover mode control information managed by an information server, according to an embodiment of the present invention.

FIG. 3A is a flow chart illustrating the case where handover is performed in the serving PoS 310, according to an embodiment of the present invention.

When the serving PoS 310 (see FIG. 3B) receives handover mode control information regarding that the serving PoS is a handover initiator from an information server 330 (see FIG. 3B), the serving PoS 310 searches for a network that is subject to handover and collets information, in operation S310.

However, the serving PoS 310 may also receive the handover mode control information while searching for the network that is subject to handover and collecting the related information without receiving the handover mode control information from the information server 330. That is, operation S300 is not always performed prior to operation S310.

Substantial configurations of operations S320 through S350 are similar to those of operations S220 through S250 except that mechanism for initiating handover and selecting a handover target network is performed in the serving PoS 310, and thus, their descriptions can be referred to FIG. 2A.

FIG. 3B illustrates the case where handover is initiated in the serving PoS 310 according to the handover mode control information, according to an embodiment of the present invention.

As illustrated in FIG. 3B, the serving PoS 310 transmits a query regarding a handover mode to the network information server 330, in operation S360, receives a response to the query, in operation S361, and transmits a notification of initiating handover in the serving POS 310 to a user terminal 300, in operation S362. Thus, the user terminal 300 and the serving PoS 310 can consistently perform handover.

FIG. 3B illustrates an example of the case where a handover initiator is the serving PoS 310. Alternatively, the serving PoS 310 may receive notification regarding the handover mode control information from the information server 330 without any request. In addition, it will be understood by one of ordinary skill in the art that a handover initiator may be determined by the information server 330.

FIG. 3C illustrates a method in which handover is initiated in the serving PoS 310, according to an embodiment of the present invention.

A handover method includes operation S310 of recognizing a handover initiator, searching for a network that is subject to handover, and collecting related information, operation S320 of selecting candidate networks, operation S330 of selecting a target network, and operations S340 and S350 of performing and completing handover.

The serving PoS 310 requests information regarding a network that is subject to handover by transmitting a neighboring network information query message to the information server 330, and the information server 330 transmits the information regarding the network that is subject to handover by transmitting a neighboring network information response to the serving PoS 310 in response to the neighboring network information query message.

The neighboring network information query message may include a query regarding whether the serving PoS 310 itself initiates handover. In this case, the neighboring network information response message may include the handover mode control information indicating an entity for initiating handover from among a plurality of entities. That is, operation S310 may be performed together with operations illustrated in FIG. 3B.

It will be understood by one of ordinary skill in the art that the serving PoS 310 may recognize that the serving PoS 310 itself is a handover initiator by transmitting a query to the information server 330 or notification of the information server 330 without any request, for example, by obtaining the handover mode control information, as illustrated in FIG. 1.

The serving PoS 310 may receive information regarding a kind of each neighboring network (e.g., IEEE 802.11, IEEE 802.16, CDMA, UMTS, etc.), an address of a network connection device (e.g., MAC address and IP address of PoA or AR) and a network service provider or the like.

The serving PoS 310 completes operation S310 of searching for the network that is subject to handover and collecting related information, and then operation S320 of selecting candidate networks is performed. In this case, the serving PoS 310 checks whether handover is required.

For example, the user terminal 300 checks a current network link that is currently connected to the user terminal 300 and a heterogeneous network to which the user terminal 300 can perform handover in real-time to measure the quality and signal strength of the current network link and the quality and signal strength of the heterogeneous network. Then, when the measured values of the current network link are equal to or less than threshold values, and the measured values of the heterogeneous network are equal to or more than threshold values, it is determined that handover is required. This is only for illustrative purpose, and thus it will be understood by one of ordinary skill in the art that various changes in form and details may be made.

When the handover is required in the serving PoS 310, the serving PoS 310 transmits a handover intention query message regarding whether the user terminal 300 intends to perform handover, and information regarding a network interface and network subscription to the user terminal 300.

The user terminal 300 sets whether handover is performed and whether handover is intended between heterogeneous networks of the user terminal 300 in response to the handover intention query message, and transmits a handover intention response message to the serving PoS. The response message includes, for example, information regarding a network interface included in the user terminal 300 and information regarding neighboring network subscriptions to the serving PoS 310.

The serving PoS 310 checks whether handover is intended between heterogeneous handover of the user terminal 300 from the handover intention response message. When handover is intended between heterogeneous handover of the user terminal 300, handover candidate networks are selected by extracting information regarding the handover candidate networks to which handover is performed by user terminal 300 from among information regarding all neighboring networks obtained from the information server 330 according to the information regarding a network interface included in the user terminal 300 and the information regarding network subscription.

After that, the serving PoS 310 transmits a query regarding whether resources for supporting the user terminal 300 are available to candidate PoSs 320 positioned in the handover candidate networks. Each of the candidate PoSs 320 checks whether the resources for the user terminal 300 are available in a network in which each of the candidate PoSs 320 is positioned, and responds to the serving PoS 310 (Candidate Resource Response).

The serving PoS 310 collects responses from the candidate PoSs 320 of the handover candidate networks, and selects candidate PoS 320 to which handover can be performed by the user terminal 300.

When the handover candidate networks are selected in operation S320, a target network decision phase (operation s330) is performed.

The serving PoS 310 determines a handover target network according to the information checked by the candidate PoS. When the number of the selected handover target networks is at least two, final unique handover target network is determined according to QoS and service costs.

When the number of the final handover target networks selected according to the QoS and service costs is at least two, the final handover target network is selected according to the priority order that is previously set.

When the target network is determined, a handover execution phase (operation S340) is performed by the user terminal 300 to the target network.

The serving PoS 310 determines the final unique target network, and then the serving PoS 310 transmits request for handover by transmitting a heterogeneous handover request message to the user terminal 300.

Simultaneously, the serving PoS 310 reports a fact that the user terminal 300 performs handover to the target network by transmitting a heterogeneous handover notify message to the target PoS 320.

The user terminal 300 reports a fact that handover is performed with respect to the final handover target network by transmitting a heterogeneous handover response message to the serving PoS 310 in response to the heterogeneous handover request message transmitted from the serving PoS 310.

The target PoS 320 transmits a heterogeneous handover response message indicating that the target PoS 320 recognizes that the user terminal 300 is about connect to the final handover target network to the serving PoS 310 in response to the heterogeneous handover notify message. Thus, a handover execution phase (operation S340) is performed.

The user terminal 300 performs the handover execution phase (operation S340) with respect to the target network, thereby completing a handover completing phase (operation S350). The handover completing phase (operation S350) is performed by exchanging complete messages between the serving PoS 310 and the target PoS 320.

In particular, when the user terminal 300 completes handover, the target PoS 320 reports a fact that handover is completed by transmitting a handover complete notification message to the serving PoS 310. The serving PoS 310 transmits a handover complete response message to the target PoS 320, thereby completing the handover completing phase (operation S350).

Figure 4:
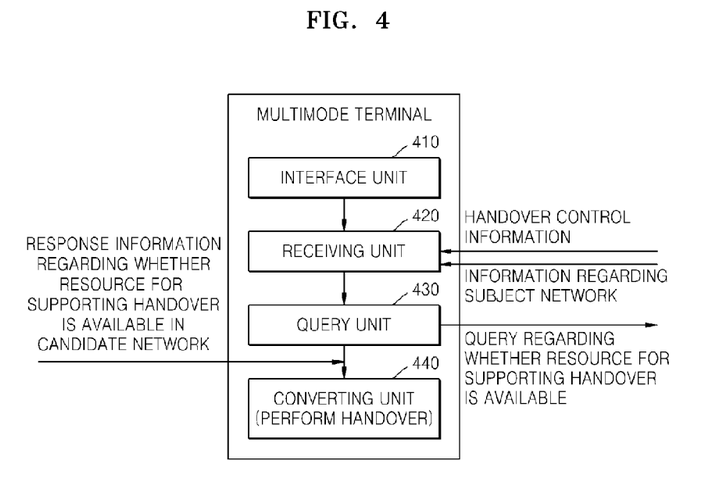
FIG. 4 is a structural view of a terminal according to an embodiment of the present invention.

FIG. 4 is a structural view of a terminal according to an embodiment of the present invention.

The terminal selecting a network to which handover is performed in heterogeneous networks includes an interface unit 410, a receiving unit 420, a query unit 430 and a converting unit 440.

The terminal includes at least one interface unit 410 in order to interface at least one heterogeneous network.

The receiving unit 420 receives handover mode control information defining an object for initiating handover from among at least one object in a system environment including at least one object that can initiate handover between heterogeneous networks from an information server. The object that can initiate handover includes a user terminal, a serving POS, or the like.

The query unit 430 receives network information a network that is subject to handover in heterogeneous networks, selects handover candidate networks that can initiate handover according to the information, and then transmits a query regarding whether resources for supporting handover are available to the selected candidate networks. That is, the searching for the network (operation S210) and the candidate network selection phase (operation S220), illustrated in FIG. 2B, may be performed in the query unit 430.

The converting unit 440 requests a handover target network that is determined according to responses of the handover candidate networks and finally performs handover and receives a response. That is, the selecting of the handover target network (operation S230) and the handover execution phase (operation S240) with respect to the handover target network, illustrated in FIG. 2B, are performed.

The invention can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by one of ordinary skill in the art that various changes in form and details may be made therein without departing from the spirit and scope of the present invention as defined by the following claims.

The invention claimed is:

1. A method of selecting a handover target network in a terminal, the method comprising:

transmitting a first query regarding a handover mode to an information server, and receiving a response to the first query from the information server, wherein the response to the first query from the information server comprises handover mode control information that indicates whether the terminal is a handover initiator;

transmitting a handover mode notification message to a network point of service (PoS) that is currently connected to the terminal, when the handover mode control information indicates that the terminal is the handover initiator;

requesting the information server for information regarding a candidate network that is subject to handover, and receiving the information regarding the candidate network that is subject to handover in response to the request;

determining a signal strength of a current network link between the terminal and the network PoS that is currently connected to the terminal;

determining a signal strength of the candidate network;

determining that handover is required based on a first comparison of the signal strength of the current network link to a first threshold, and based on a second comparison of the signal strength of the candidate network to a second threshold;

in response to the determining that handover is required, transmitting a second query to the candidate network regarding whether a resource of the candidate network is available to support the terminal's handover, and receiving a response to the second query from the candidate network;

in response to the receiving the response to the second query from the candidate network, determining that the candidate network is a target network; and in response to the determining that the candidate network is the target network, requesting the target network to perform handover and receiving a response to the request to perform handover from the target network.

2. The method of claim 1, further comprising:

when the terminal receives information regarding a state where handover is completed in the network PoS that is currently connected to the terminal from the target network, responding to the information regarding the state.

3. The method of claim 1, further comprising:
when the terminal receives a third query regarding whether the resource of the candidate network is available from the network PoS that is currently connected to the terminal, transmitting a fourth query regarding whether a resource for initiating handover of the terminal is available in the candidate network.

4. The method of claim 3, further comprising:
when the candidate network receives the fourth query regarding whether the resource for initiating handover of the terminal is available, transmitting a response to the fourth query to the network PoS that is currently connected to the terminal.

5. The method of claim 1, further comprising:
when the terminal receives a request for handover from the network PoS that is currently connected to the terminal, requesting the target network to perform resource assignment for handover of the terminal.

6. The method of claim 5, further comprising:
reporting that the request for handover is accepted in response to the request to perform the resource assignment for handover of the terminal, wherein the reporting is performed by the target network.

7. The method of claim 1, wherein the terminal comprises at least one interface for performing handover between heterogeneous networks.

8. The method of claim 1, wherein the determining that handover is required comprises determining that handover is required when the signal strength of the current network link is less than the first threshold and when the signal strength of the candidate network is greater than the second threshold.

9. The method of claim 1, wherein the candidate network is a different kind of network than the network to which the network PoS that is currently connected to the terminal belongs.

10. A method of selecting a handover target network, the method comprising:
transmitting a first query regarding a handover mode to an information server, and receiving a response to the first query from the information server, wherein the transmitting the first query regarding the handover mode and the receiving the response to the first query from the information server are performed by a network point of service (PoS) that is currently connected to a terminal, and wherein the response to the first query from the information server comprises handover mode control information that indicates whether the network PoS currently connected to the terminal is a handover initiator;
transmitting a handover mode notification message to the terminal from the network PoS that is currently connected to the terminal, when the handover mode control information indicates that the network PoS that is currently connected to the terminal is the handover initiator;
requesting the information server for information regarding a candidate network that is subject to handover, and receiving the information regarding the candidate network that is subject to handover in response to the request, wherein the requesting and the receiving the information regarding the candidate network that is subject to handover are performed by the network PoS that is currently connected to the terminal;
determining a signal strength of a current network link between the terminal and the network PoS that is currently connected to the terminal;
determining a signal strength of the candidate network;
determining that handover is required based on a first comparison of the signal strength of the current network link to a first threshold, and based on a second comparison of the signal strength of the candidate network to a second threshold;
transmitting a second query to the terminal regarding whether the terminal intends to perform handover initiated by the network PoS, which is currently connected to the terminal, and receiving a response to the second query from the terminal;
transmitting a third query regarding whether a resource of the candidate network is available to the candidate network that is selected according to the response to the second query regarding whether the terminal intends to perform handover and the information regarding the candidate network that is subject to handover, and receiving a response to the third query regarding whether the resource of the candidate network is available, wherein the transmitting the third query to the candidate network and the receiving the response to the third query regarding whether the resource of the candidate network is available are performed by the network PoS that is currently connected to the terminal;
in response to the receiving the response to the third query regarding whether the resource of the candidate network is available, determining that the candidate network is a target network; and
in response to the determining that the candidate network is the target network, requesting the target network to perform handover, and receiving a response to the request to perform handover from the target network.

11. The method of claim 10, further comprising:
transmitting information regarding a state where handover is completed in the network PoS that is currently connected to the terminal from the target network to the terminal, and receiving a response to the information regarding the state.

12. The method of claim 10, wherein the terminal comprises at least one interface for performing handover between heterogeneous networks.

13. The method of claim 10, wherein the determining that handover is required comprises determining that handover is required when the signal strength of the current network link is less than the first threshold and when the signal strength of the candidate network is greater than the second threshold.

14. The method of claim 10, wherein the candidate network is a different kind of network than the network to which the network PoS that is currently connected to the terminal belongs.

15. A computer program product comprising a non-transitory computer-readable medium, wherein the non-transitory computer-readable medium comprises computer-readable code that, when executed by a computer, causes the computer to:
transmit a first query regarding a handover mode to an information server, and receive a response to the first query from the information server, wherein the response to the first query from the information server comprises handover mode control information that indicates whether a terminal is a handover initiator;
transmit a handover mode notification message to a network point of service (PoS) that is currently connected to the terminal, when the handover mode control information indicates that the terminal is the handover initiator;
request the information server for information regarding a candidate network that is subject to handover, and receive the information regarding the candidate network that is subject to handover in response to the request;

determine a signal strength of a current network link between the terminal and the network PoS that is currently connected to the terminal;

determine a signal strength of the candidate network;

determine that handover is required based on a first comparison of the signal strength of the current network link to a first threshold, and based on a second comparison of the signal strength of the candidate network to a second threshold;

in response to the determining that handover is required, transmit a second query regarding whether a resource of the candidate network is available to support the terminal's handover;

in response to receiving a response to the second query, determine that the candidate network is a target network; and in response to the determining that the candidate network is the target network, transmit a request to perform handover involving the target network.

* * * * *